United States Patent
Koyama et al.

(10) Patent No.: US 12,466,438 B2
(45) Date of Patent: Nov. 11, 2025

(54) VEHICLE CONTROL METHOD AND VEHICLE CONTROL DEVICE

(71) Applicant: DENSO TEN Limited, Kobe (JP)

(72) Inventors: Kazuya Koyama, Kobe (JP); Tomoya Takagi, Kobe (JP); Haruo Harada, Kobe (JP); Yasuomi Kimura, Kobe (JP); Miki Hitotsuya, Kobe (JP)

(73) Assignee: DENSO TEN Limited, Kobe (JP)

( * ) Notice: Subject to any disclaimer, the term of this patent is extended or adjusted under 35 U.S.C. 154(b) by 289 days.

(21) Appl. No.: 18/121,942

(22) Filed: Mar. 15, 2023

(65) Prior Publication Data

US 2023/0211804 A1 Jul. 6, 2023

Related U.S. Application Data

(63) Continuation of application No. PCT/JP2021/010448, filed on Mar. 15, 2021.

(51) Int. Cl.
*B60W 60/00* (2020.01)
*G01C 21/34* (2006.01)
*G06V 20/56* (2022.01)

(52) U.S. Cl.
CPC ..... *B60W 60/0015* (2020.02); *G01C 21/3461* (2013.01); *G06V 20/56* (2022.01); *B60W 2420/403* (2013.01); *B60W 2540/00* (2013.01); *B60W 2555/00* (2020.02)

(58) Field of Classification Search
CPC .......... B60W 60/0015; G01C 21/3461; G06V 20/56
See application file for complete search history.

(56) References Cited

U.S. PATENT DOCUMENTS

| | | | |
|---|---|---|---|
| 11,305,416 B1* | 4/2022 | Correnti | G05B 19/042 |
| 2015/0234398 A1* | 8/2015 | Harris | B25J 5/00 700/250 |
| 2017/0225336 A1* | 8/2017 | Deyle | B25J 11/008 |
| 2019/0244504 A1* | 8/2019 | Ebata | G08B 25/002 |
| 2020/0324778 A1* | 10/2020 | Diamond | G01C 21/3819 |
| 2020/0364653 A1* | 11/2020 | Rongley | G05D 1/227 |
| 2021/0110683 A1* | 4/2021 | Guan | G01C 21/3461 |

FOREIGN PATENT DOCUMENTS

| | | | |
|---|---|---|---|
| JP | H11-085281 A | | 3/1999 |
| JP | 2017-131501 A | | 8/2017 |
| JP | 2017131501 A1 | * | 8/2017 |
| JP | 2018-010579 A | | 1/2018 |

* cited by examiner

*Primary Examiner* — Khoi H Tran
*Assistant Examiner* — Tristan J Greiner
(74) *Attorney, Agent, or Firm* — Oliff PLC

(57) ABSTRACT

A vehicle control method according to an embodiment is a vehicle control method to be executed by a controller for controlling a vehicle that travels in an area, wherein the controller is configured to: in a case where detecting occurrence of a disaster and determining that nobody is riding on the vehicle, cause the vehicle to move to a refuge place, and the refuge place includes at least one of a place in which the vehicle having taken refuge hinders passage of an evacuee toward an outside of the evacuation route and a place in which the vehicle having taken refuge prevents an evacuee from entering a dangerous zone.

10 Claims, 8 Drawing Sheets

DURING DISASTER MODE

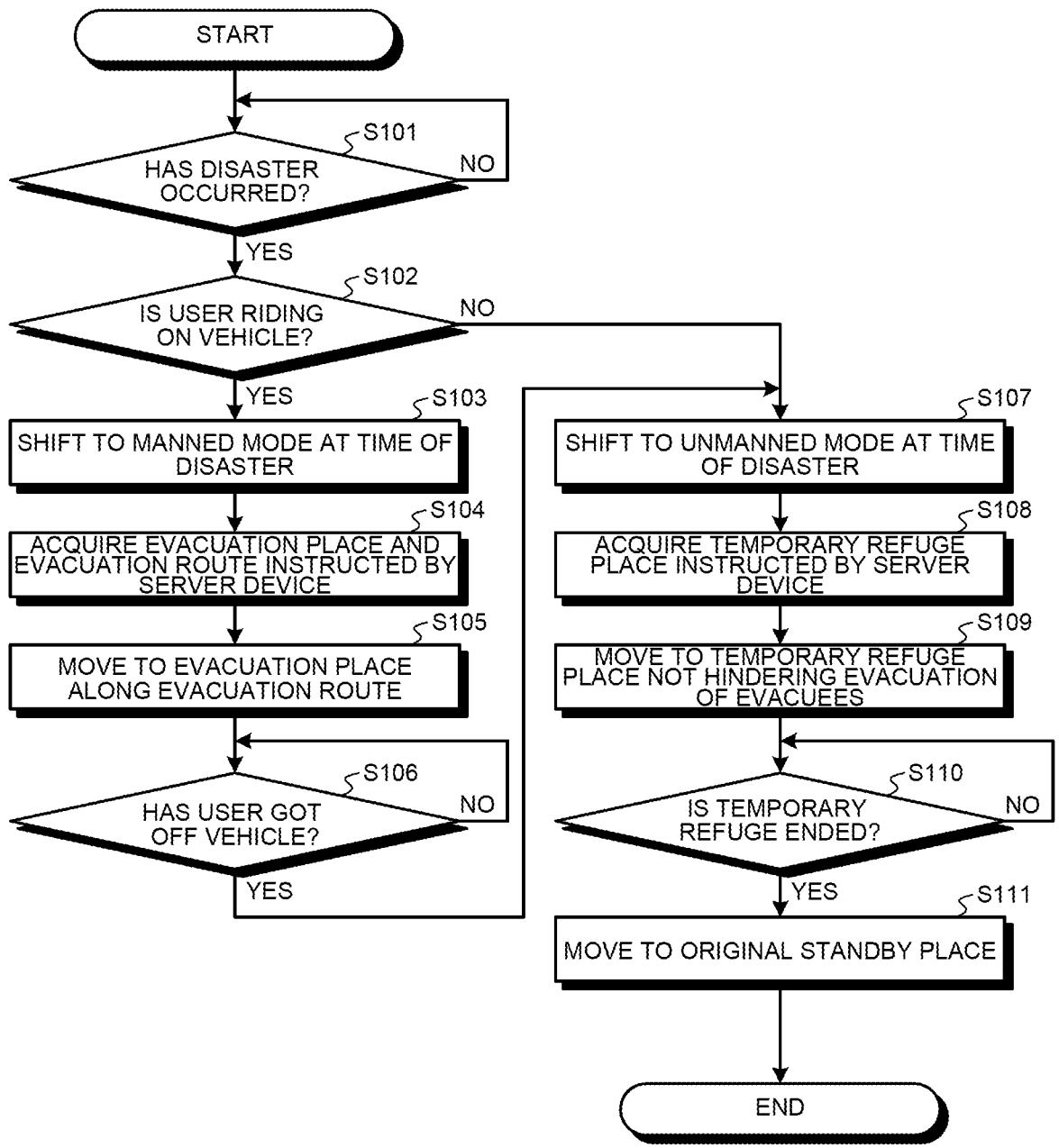

VEHICLE CONTROL METHOD AND VEHICLE CONTROL DEVICE

CROSS-REFERENCE TO RELATED APPLICATION

This application is a continuation of International Application No. PCT/JP2021/010448, filed on Mar. 15, 2021, the entire contents of which are incorporated herein by reference.

FIELD

The embodiment discussed herein is directed to a vehicle control method and a vehicle control device.

BACKGROUND

Conventionally, there are known an ultra-compact mobility device and a personal mobility device (hereinafter, simply referred to as a "mobility device"), which are vehicles that assist movement of a user in a predetermined area such as a large-scale commercial facility or a medical nursing home.

To reduce a burden on the user who causes such a mobility device to move, there is also developed a vehicle control system that generates a route to a destination when the user inputs the destination to the mobility device, and causes the mobility device to automatically move to the destination along the route (for example, refer to Japanese Laid-open Patent Publication No. 2018-010579).

However, in the related art, examination about vehicle control for mobility devices at the time when a disaster such as a fire or an earthquake occurs has not made progress, so that such examination is required to be sufficiently carried out in view of safety. For example, at the time of evacuation, the mobility device itself should not hinder evacuation action of evacuees.

SUMMARY

A vehicle control method according an aspect of an embodiment is a vehicle control method to be executed by a controller for controlling a vehicle that travels in an area, wherein the controller is configured to: in a case where detecting occurrence of a disaster and determining that nobody is riding on the vehicle, cause the vehicle to move to a refuge place, and the refuge place includes at least one of a place in which the vehicle having taken refuge hinders passage of an evacuee toward an outside of the evacuation route and a place in which the vehicle having taken refuge prevents an evacuee from entering a dangerous zone.

BRIEF DESCRIPTION OF DRAWINGS

FIG. 12 is a flowchart illustrating a processing procedure performed by the onboard device according to the embodiment.

DESCRIPTION OF EMBODIMENTS

The following describes an embodiment of a vehicle control method and a vehicle control device disclosed herein in detail with reference to the attached drawings. The present invention is not limited to the embodiment described below.

In the following description, a vehicle V according to the embodiment is assumed to be an ultra-compact mobility device or a personal mobility device as a vehicle that assists movement of a user in a predetermined area such as a large-scale commercial facility, a medical nursing home, or an airport facility.

Each of facilities described above may be a facility constituted of one building such as a large-scale department store, or a facility in which a plurality of buildings are disposed within a site such as a shopping mall. The building may be a multi-storied building, or a one-storied building without other stories.

The vehicle V may be a vehicle that is lent out to a user who uses a facility by an operation side of the facility, or a privately owned vehicle that is usually used by the user outside the facility. In a case of the privately owned vehicle V, an application that enables information processing on the vehicle V side described below may be downloaded and installed in advance before visiting the facility or at the time of visiting the facility.

In the following description, exemplified is a case in which the vehicle control device according to the embodiment is an onboard device 10 mounted on the vehicle V.

Figure 1:
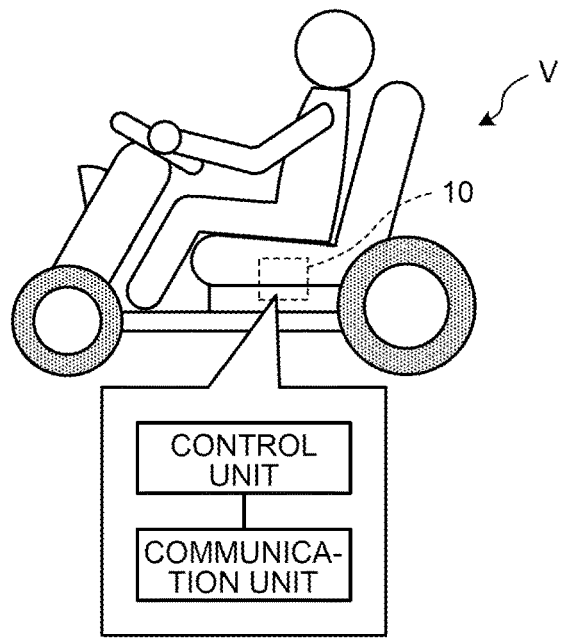
FIG. 1 is a diagram illustrating a schematic configuration of a vehicle according to an embodiment.
Figure 2:
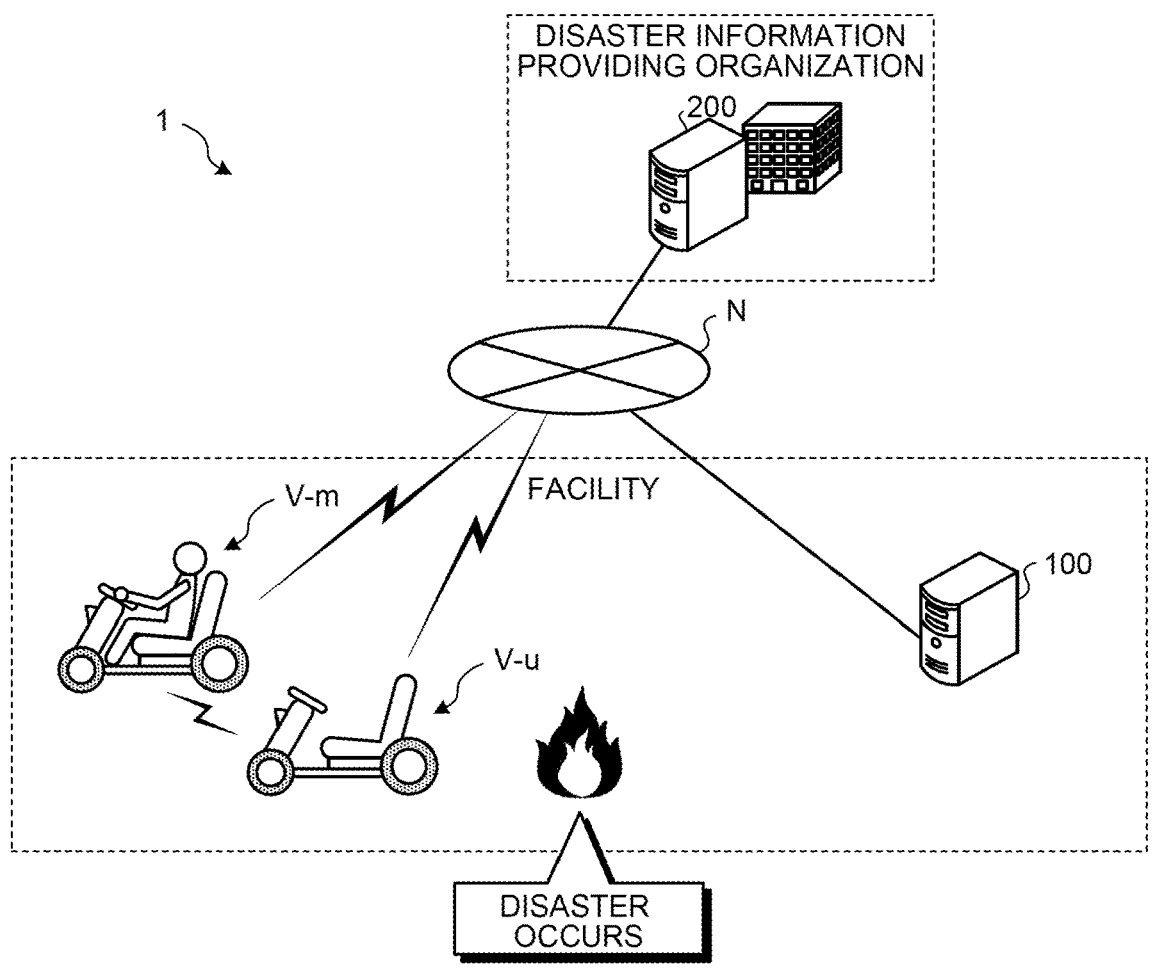
FIG. 2 is a diagram illustrating a configuration example of a vehicle control system according to the embodiment.

FIG. 1 is a diagram illustrating a schematic configuration of the vehicle V according to the embodiment. FIG. 2 is a diagram illustrating a configuration example of the vehicle control system according to the embodiment. FIG. 3 to FIG. 6 are outline explanatory diagrams (part 1) to (part 4) of the vehicle control method according to the embodiment.

As illustrated in FIG. 1, the vehicle V according to the embodiment is substantially a single-seated or double-seated electric vehicle known as an ultra-compact mobility device or a personal mobility device. Herein, the vehicle V is described as an electric vehicle using a motor as a power source, but the vehicle V may also be a vehicle using another power source such as an internal combustion engine as a power source. There are various types of vehicles V such as a wheelchair type and a standing-ride type in addition to a cart type illustrated in FIG. 1.

As illustrated in FIG. 1, the vehicle V includes the onboard device 10. The onboard device 10 includes a control unit and a communication unit. The control unit controls the vehicle V by manual driving control by a driving operation performed by a user, an instruction from an external device acquired via the communication unit, and automatic driving control based on an external situation and the like acquired via an onboard sensor unit (not illustrated).

The onboard device 10 can cause the vehicle V to perform automatic traveling by automatic driving control in any of a manned state in which a user is riding on the vehicle as illustrated in FIG. 1 and an unmanned state in which the user is not riding on the vehicle. In the following description, the vehicle V in the manned state may be referred to as a "manned vehicle V-m", and the vehicle V in the unmanned state may be referred to as an "unmanned vehicle V-u".

In recent years, the vehicle V as described above starts to be introduced as moving means for a user in a facility such as a large-scale commercial facility or a medical nursing home. However, examination about vehicle control for the vehicle V at the time when a disaster such as a fire and an earthquake occurs has not made progress. Thus, also in view of safety, it is preferable to enrich the vehicle control method for the vehicle V at the time when a disaster occurs.

Thus, in the vehicle control method according to the embodiment, if nobody is riding on the vehicle V in a case in which a disaster requiring evacuation occurs, the vehicle V is caused to move to a refuge place not hindering evacuation of evacuees.

Specifically, the following describes a vehicle control system 1 to which the vehicle control method according to the embodiment is applied. As illustrated in FIG. 2, the vehicle control system 1 according to the embodiment includes vehicles V including the manned vehicle V-m and the unmanned vehicle V-u, a server device 100, and a disaster information providing device 200. Each of the number of manned vehicles V-m and the number of unmanned vehicles V-u may be one or multiple in a facility. The manned vehicle V-m and the unmanned vehicle V-u are the vehicles V basically having the same configuration, and are different from each other only in whether a person is riding thereon. The unmanned vehicle V-u may be configured by the vehicle V having a configuration different from that of the manned vehicle V-m, for example, the vehicle V dedicated to carrying baggage.

The server device 100 is a device that manages and controls various devices in the facility including the vehicle V, and is disposed in the facility, for example. The server device 100 is implemented as a cloud server, and may be disposed outside the facility, for example. The server device 100 corresponds to an example of a "monitoring device".

The disaster information providing device 200 is a device that is disposed in a disaster information providing organization such as the Meteorological Agency, for example, and provides disaster information about a fire, an earthquake, and the like. The disaster information providing device 200 may be a device operated and managed by a private company that provides a disaster information providing service.

The vehicle V, the server device 100, and the disaster information providing device 200 are disposed to be able to communicate with each other via a network N such as the Internet or a mobile telephone line network. The vehicles V can also communicate with each other via vehicle-to-vehicle communication, for example.

In a case in which a disaster requiring evacuation occurs inside the facility or outside the facility, the vehicle V and the server device 100 detect the disaster based on a situation inside the facility acquired by itself and disaster information provided from the disaster information providing device 200.

Figure 3:
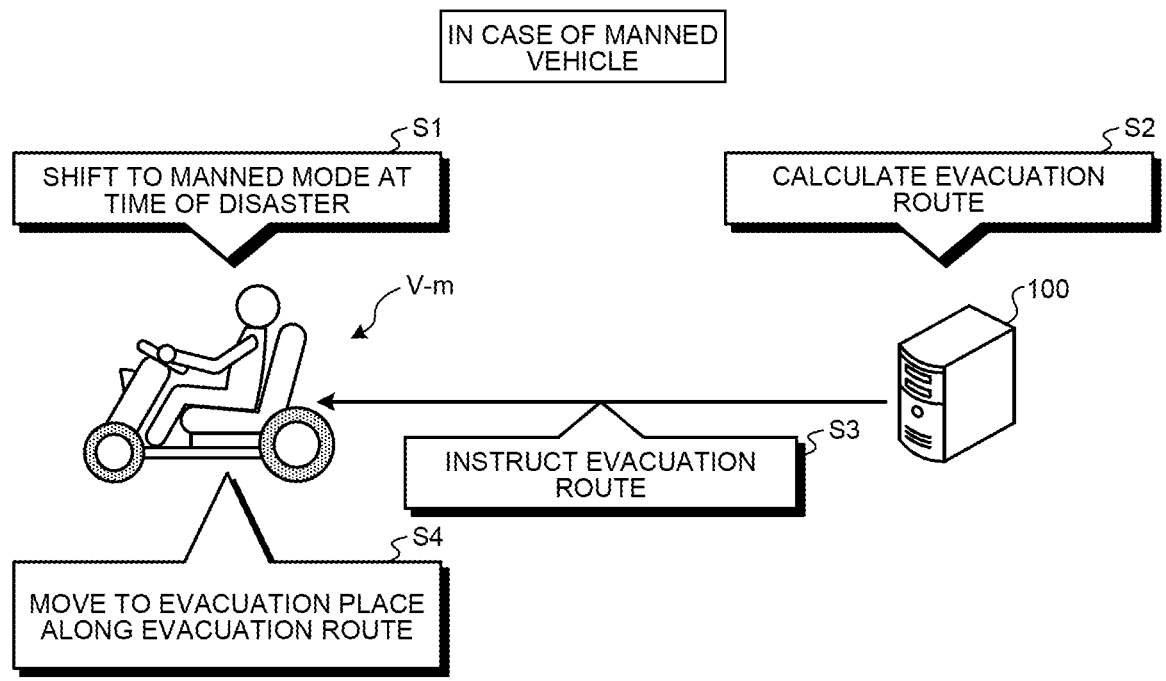
FIG. 3 is an outline explanatory diagram (part 1) of a vehicle control method according to the embodiment.

Herein, in a case in which a disaster occurs, most of people present in the facility (hereinafter, referred to as "evacuees") as well as the user riding on the manned vehicle V-m take evacuation action of moving to a final evacuation place that is determined in advance to be a designated evacuation place of the facility. The final evacuation place is a final place to which employees and customers are guided to evacuate by the facility side at the time when a disaster occurs. Examples of the final evacuation place include evacuation places determined in advance for each facility such as a place outside a building (outdoors) in a case of a fire or an earthquake, for example, and an upper floor (including a rooftop) in a case of a tidal wave, for example. To assist such evacuation action, in the vehicle control method according to the embodiment, as illustrated in FIG. 3, first, the manned vehicle V-m shifts to a manned mode at the time of a disaster when detecting occurrence of a disaster (Step S1).

At the same time, the server device 100 acquires a situation inside the facility via a sensor unit in the facility as various sensors including a camera and the like, and calculates an evacuation place appropriate for evacuation within a movable range of the manned vehicle V-m and an evacuation route heading for the evacuation place based on the situation inside the facility (Step S2).

The "evacuation place appropriate for evacuation" herein includes, in addition to the final evacuation place described above, a temporary evacuation place where people can stand by for evacuation although it is not the final evacuation place. In a case of a fire, for example, the temporary evacuation place is a place distant from an origin of the fire where a window (evacuation window) and the like connected to the outside are disposed. In a case of an earthquake, it is a place including a larger space and the like.

Evacuation exits at the time of moving between floors to evacuate include an escalator on which people can walk to going up and down even when the escalator is stopping in addition to an elevator and stairs (emergency exit). Furthermore, a slope on which people can travel while riding on the vehicle V to move between floors may be disposed.

The emergency exits at the time of a disaster also include an entrance to a route present in an entry prohibited region (staff-only region) that a customer cannot enter at a normal time. In a case of guiding the customer to the entrance in the entry prohibited region, a guide display disposed on a wall and the like is insufficient in some cases because the region is not for the customer, so that it is preferable to provide route guidance after the customer enters the entry prohibited region.

The server device 100 then instructs the manned vehicle V-m of the calculated evacuation route (Step S3). The manned vehicle V-m instructed of the evacuation route moves to the evacuation place along the evacuation route (Step S4).

At this point, the server device 100 may notify the manned vehicle V-m of guidance information for guiding the evacuation route, and may cause the manned vehicle V-m to move by manual driving control, which is performed by a driving operation by a user riding on the manned vehicle V-m, in accordance with the guidance information.

Alternatively, in accordance with an instruction from the server device 100, the onboard device 10 may cause the manned vehicle V-m to move by automatic traveling by automatic driving control.

Figure 4:
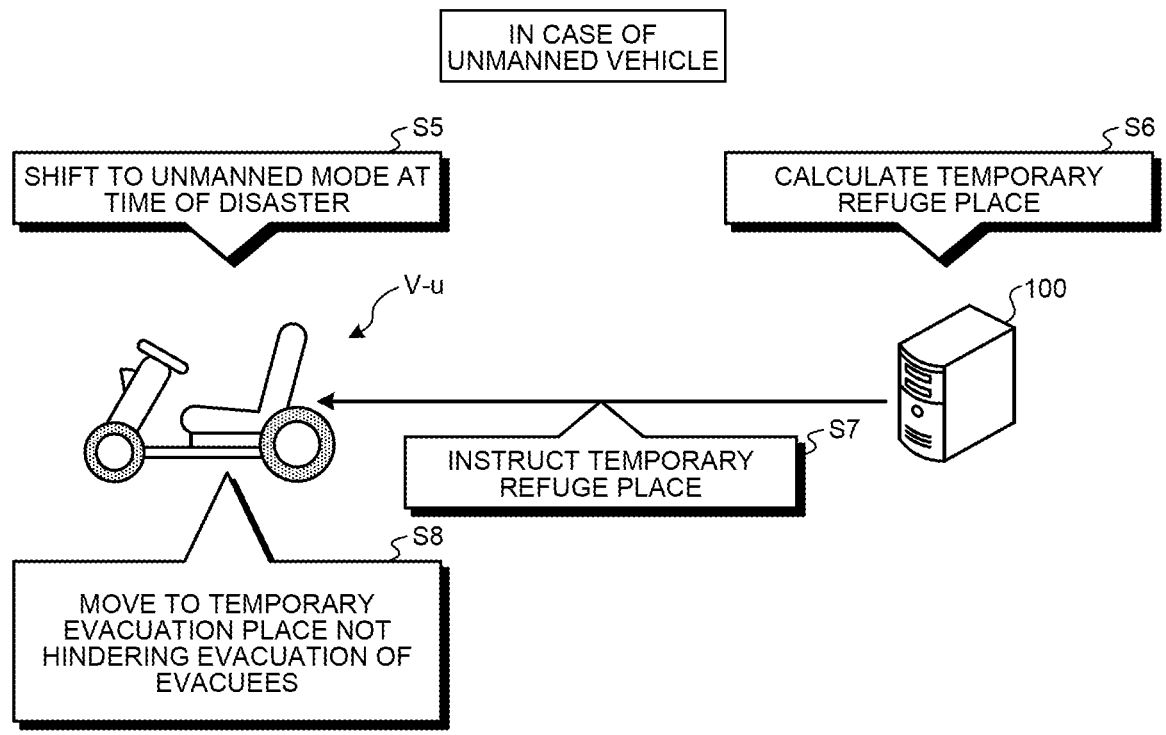
FIG. 4 is an outline explanatory diagram (part 2) of the vehicle control method according to the embodiment.

On the other hand, the unmanned vehicle V-u should not hinder evacuation action of the evacuees. Thus, as illustrated in FIG. 4, in the vehicle control method according to the embodiment, the unmanned vehicle V-u shifts to an unmanned mode at the time of a disaster when detecting occurrence of a disaster (Step S5).

When receiving an instruction about a temporary refuge place that is calculated by the server device 100 based on a situation inside the facility (Step S6, S7), the unmanned vehicle V-u moves to the temporary refuge place not hindering evacuation of the evacuees by automatic driving in accordance with the instruction (Step S8).

Figure 5:
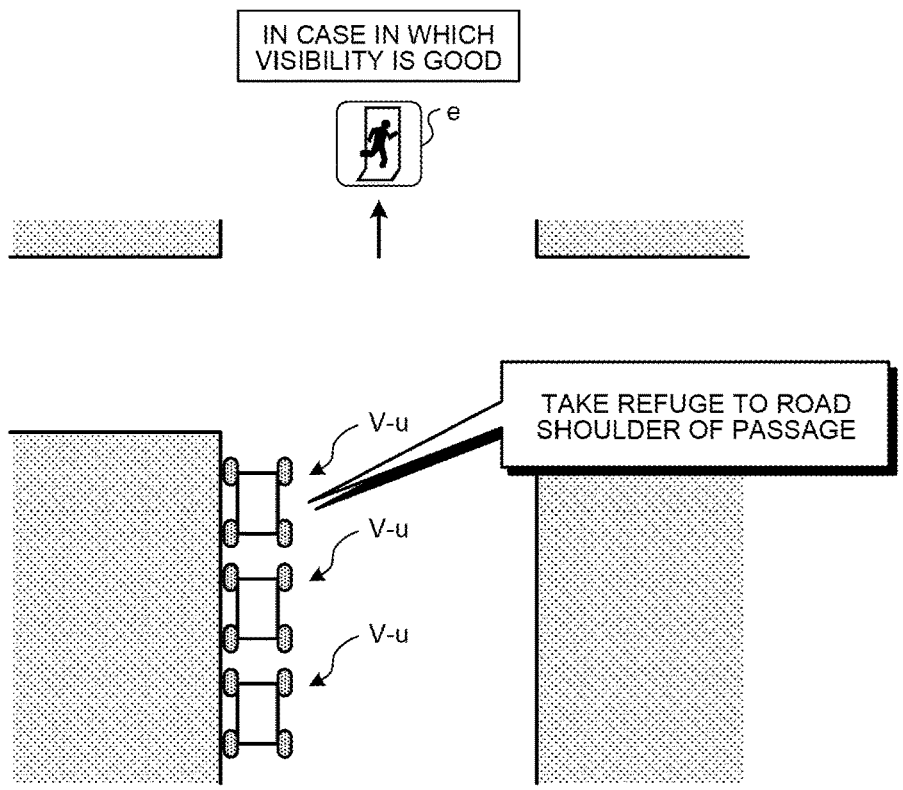
FIG. 5 is an outline explanatory diagram (part 3) of the vehicle control method according to the embodiment.

Specifically, as illustrated in FIG. 5, in a case in which the onboard sensor unit detects that visibility is good, at the temporary refuge place, the unmanned vehicle V-u takes refuge to a road shoulder as an end of a passage leading to an evacuation place e for the evacuees (in a case of the inside of the building, a wall side of the passage). Due to this, passage of the evacuees can be prevented from being hindered in a situation in which the visibility is good.

Figure 6:
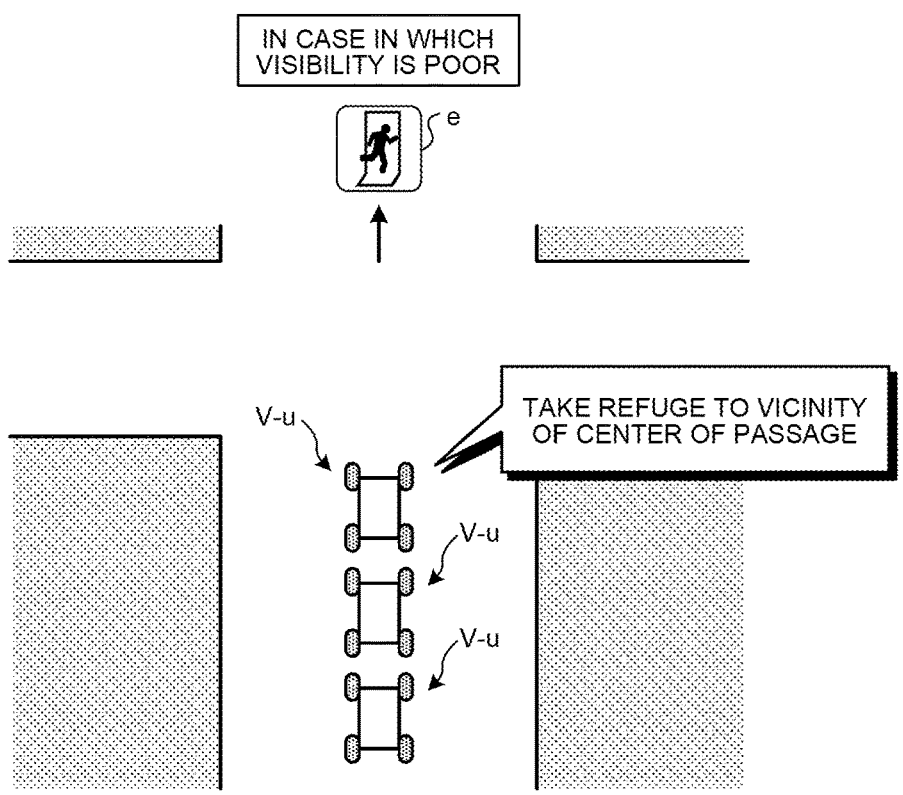
FIG. 6 is an outline explanatory diagram (part 4) of the vehicle control method according to the embodiment.

On the other hand, as illustrated in FIG. 6, in a case in which the onboard sensor unit detects that the visibility is poor, at the temporary refuge place, the unmanned vehicle V-u takes refuge to the vicinity of a center of the passage leading to the evacuation place e for the evacuees. This is because the evacuees often move along a wall in a situation in which the visibility is poor due to smoke of a fire, a non-lit lighting fixture caused by a power failure, and the like. Due to this, passage of the evacuees can be prevented from being hindered in a situation in which the visibility is poor.

As illustrated in FIG. 5 and FIG. 6, the unmanned vehicles V-u are preferably stopped in a line during temporary refuge such as being arranged in a line along the passage, for example. Due to this, passage of the evacuees can be prevented from being hindered, and the evacuation route leading to the evacuation place e can be guided to the evacuees by the line of the unmanned vehicles V-u. Alternatively, the unmanned vehicles V-u may be stopped to hinder passage to a dangerous zone such as a point where the disaster has occurred. Such examples will be described later with reference to FIG. 11. The vehicle V in a temporary refuge state described above may indicate presence of the vehicle V and assist movement of the evacuees by turning on a light of the vehicle V by turning on the light and making voice guidance. Such examples will be described later with reference to FIG. 9, for example.

In this way, in the vehicle control method according to the embodiment, if nobody is riding on the vehicle V in a case in which a disaster requiring evacuation occurs, the vehicle V is caused to move to the refuge place not hindering evacuation of the evacuees.

Accordingly, with the vehicle control method according to the embodiment, evacuation action of the evacuees can be prevented from being hindered. The following describes a configuration example of the vehicle control system 1 according to the embodiment more specifically.

Figure 7:
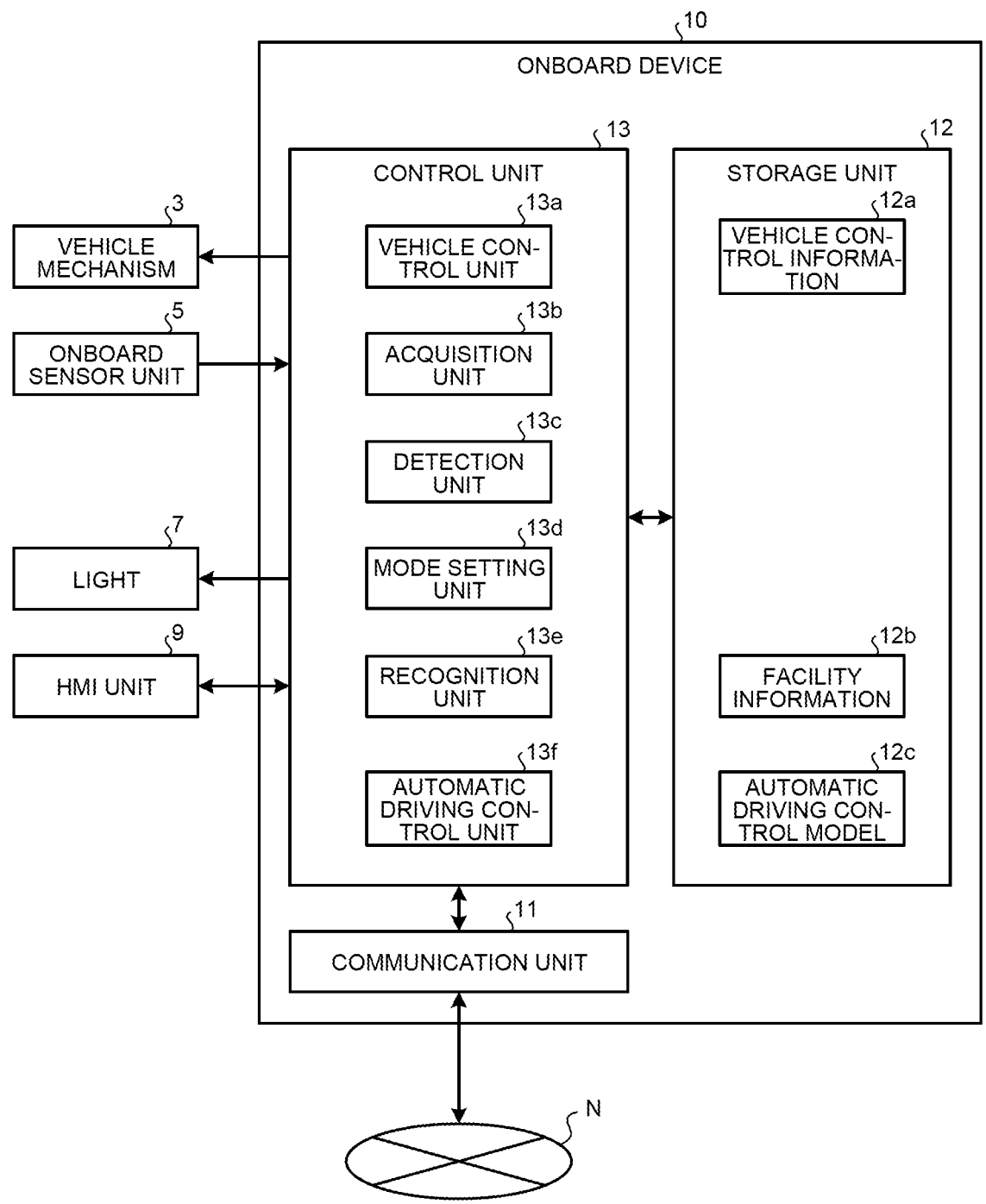
FIG. 7 is a block diagram illustrating a configuration example of an onboard device according to the embodiment.
Figure 8:
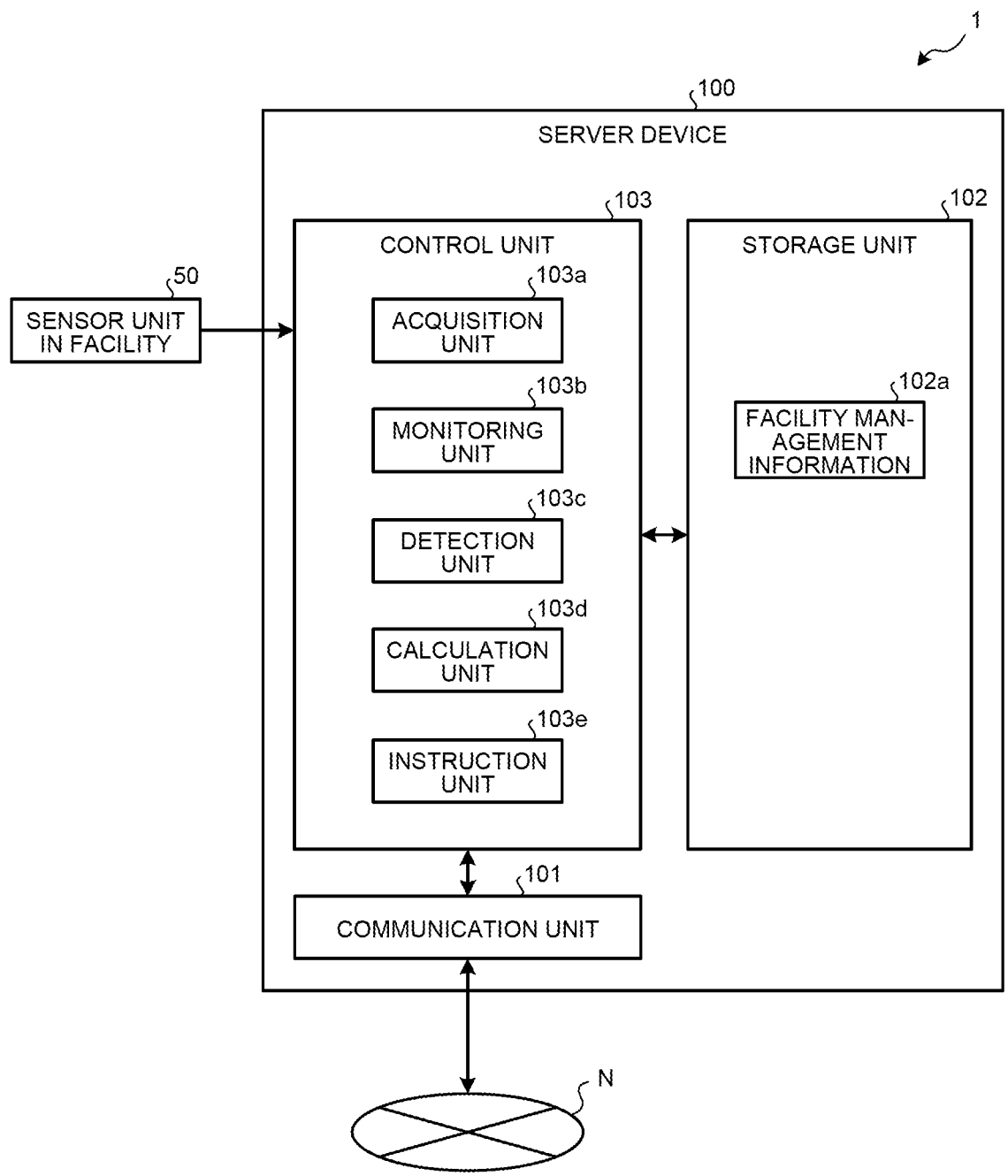
FIG. 8 is a block diagram illustrating a configuration example of a server device according to the embodiment.

FIG. 7 is a block diagram illustrating a configuration example of the onboard device 10 according to the embodiment. FIG. 8 is a block diagram illustrating a configuration example of the server device 100 according to the embodiment. FIG. 7 and FIG. 8 illustrate only constituent elements required for explaining characteristics of the present embodiment, and typical constituent elements are not illustrated therein.

In other words, the constituent elements illustrated in FIG. 7 and FIG. 8 are merely conceptual, and it is not required that they are physically configured as illustrated necessarily. For example, specific forms of distribution and integration of respective blocks are not limited to those illustrated in the drawings. All or part thereof may be functionally or physically distributed/integrated in arbitrary units depending on various loads or usage states.

In the description with reference to FIG. 7 and FIG. 8, description about the constituent element that has been already described may be simplified or omitted.

The onboard device 10 is connected to a vehicle mechanism 3, an onboard sensor unit 5, a light 7, and a Human Machine Interface (HMI) unit 9 via a Controller Area Network (CAN) and the like.

The vehicle mechanism 3 is various mechanisms that constitute a traveling system, a power system, and the like of the vehicle V. The onboard sensor unit 5 is a sensor group that is mounted on the vehicle V, and outputs various kinds of sensing data indicating situations inside and outside the vehicle V. The onboard sensor unit 5 includes, for example, a camera, a G sensor, a radar, a GPS sensor, a seating sensor, and the like.

The light 7 is a lamplight and the like mounted on the vehicle V such as a headlight and a taillight. The HMI unit 9 is various interface components for exchanging information between the user and the vehicle V, and includes software components displayed on a display unit in addition to hardware components such as an accelerator, a brake, a steering gear, the display unit, a speaker, and a microphone.

The onboard device 10 includes a communication unit 11, a storage unit 12, and a control unit 13. The communication unit 11 is implemented by a Network Interface Card (NIC) and the like, for example.

The communication unit 11 is connected to the network N described above in a wireless manner, and transmits/receives various kinds of information to/from the server device 100 and the disaster information providing device 200 via the network N. The communication unit 11 can also transmit/receive various kinds of information to/from the other vehicle V and various devices such as a roadside machine installed in the facility and a portable terminal device carried by a person via V2X communication. As a specific wireless communication scheme, Wi-Fi (registered trademark), Bluetooth (registered trademark), Ultra Wide Band (UWB), and the like can be used.

The storage unit 12 is, for example, implemented by a storage device such as a random access memory (RAM) and a flash memory, or a disk device such as a hard disk device and an optical disc device. In the example of FIG. 7, the storage unit 12 stores vehicle control information 12*a*, facility information 12*b*, and an automatic driving control model 12*c*.

The vehicle control information 12*a* is information about vehicle control for the vehicle V, and includes parameters and the like indicating various characteristics of the vehicle mechanism 3, for example. The facility information 12*b* is information about the facility, and includes map information and the like in the facility in which the vehicle V travels, for example.

The automatic driving control model 12*c* is a control model for causing the vehicle V to perform automatic driving, and is a Deep Neural Network (DNN) and the like that have performed learning to cause the vehicle V to perform automatic driving control in accordance with recognition content based on sensing data of the onboard sensor unit 5, for example. The automatic driving control model 12*c* may be stored by the server device 100.

The control unit 13 is a controller, and implemented when various computer programs (not illustrated) stored in the storage unit 12 are executed by using a RAM as a working area by a central processing unit (CPU), a micro processing unit (MPU), and the like. The control unit 13 can be, for example, implemented by an integrated circuit such as an application specific integrated circuit (ASIC) and a field programmable gate array (FPGA).

The control unit 13 includes a vehicle control unit 13a, an acquisition unit 13b, a detection unit 13c, a mode setting unit 13d, a recognition unit 13e, and an automatic driving control unit 13f, and implements or executes a function or operation of information processing described below.

The vehicle control unit 13a controls the vehicle V based on a driving operation performed by the user via the HMI unit 9, an automatic driving instruction from the automatic driving control unit 13f (described later), an instruction from the server device 100, the vehicle control information 12a, and the like.

The acquisition unit 13b acquires various kinds of sensing data from the onboard sensor unit 5. The acquisition unit 13b also acquires various kinds of information from the server device 100 and the disaster information providing device 200 via the communication unit 11.

The detection unit 13c detects occurrence of a disaster based on the various kinds of information acquired by the acquisition unit 13b. In a case of detecting occurrence of the disaster, the detection unit 13c detects whether the user is riding on the vehicle V.

In a case in which the detection unit 13c detects occurrence of the disaster, the mode setting unit 13d causes the vehicle V to shift from a normal mode to a disaster mode. At this point, in a case in which the user is riding on the vehicle V, the mode setting unit 13d causes the vehicle V to shift to the manned mode at the time of a disaster. In a case in which the user is not riding on the vehicle V, the vehicle V is shifted from the normal mode to an unmanned mode at the time of a disaster. In the normal mode, the vehicle V is caused to travel based on a user's operation at the time when the user is riding on the vehicle. Additionally, in the normal mode, at the time when the user is not riding on the vehicle, the vehicle V is caused to travel to a designated place by automatic driving based on an instruction from the server device 100, or caused to travel along a predetermined round route.

Figure 9:
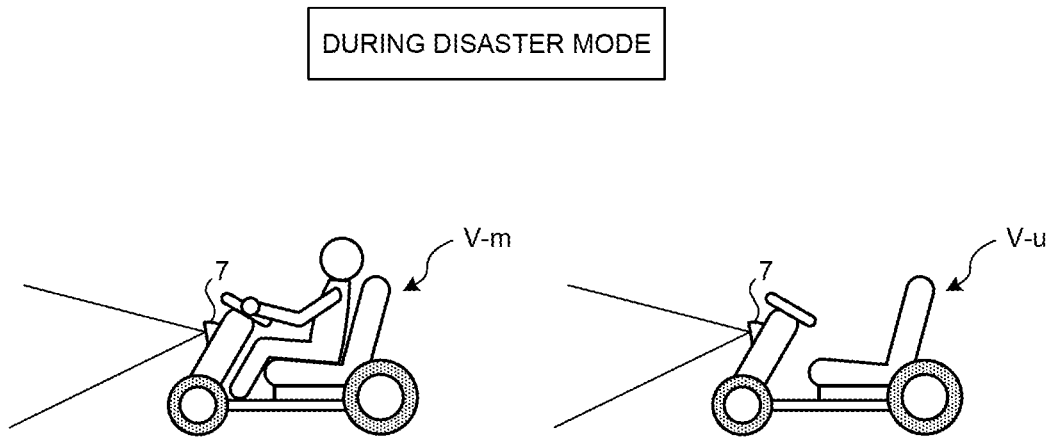
FIG. 9 is a diagram illustrating a state of a vehicle during a disaster mode.

FIG. 9 is a diagram illustrating a state of the vehicle during the disaster mode. As illustrated in FIG. 9, during the disaster mode, the mode setting unit 13d causes the light 7 to be automatically lit for both of the manned vehicle V-m and the unmanned vehicle V-u. Due to this, presence of the vehicle V can be clearly shown to the evacuees in the surroundings, visibility in the surroundings can be improved, and evacuation action of the evacuees can be assisted. It is effective to turn on the light 7 especially when the visibility is poor. The light 7 may be continuously turned on at the time of a disaster, or may be turned on only when the visibility is poor or when approach of a person is detected.

In a case in which the HMI unit 9 includes a speaker, the mode setting unit 13d may notify the surroundings of guidance information about evacuation as voice information via the speaker. In a case in which the HMI unit 9 includes a display unit, the mode setting unit 13d may notify the surroundings of guidance information about evacuation as display information via the display unit. The voice information and the display information may be combined with each other. The guidance by voice information or display information may be continuously made at the time when a disaster occurs (including a case of periodically making the guidance at every predetermined time), or may be made only when approach of a person is detected.

Return to the description of FIG. 7. The recognition unit 13e recognizes a situation around the vehicle V based on sensing data of the onboard sensor unit 5 and the like. The recognition unit 13e recognizes a situation of visibility in the surroundings. In a case in which the visibility is poor, the recognition unit 13e causes the light 7 described above to blink, and causes presence of the vehicle V to be clearly shown to the evacuees in the surroundings.

The automatic driving control unit 13f performs automatic driving control for the vehicle V based on a recognition result obtained by the recognition unit 13e and the automatic driving control model 12c, and causes the vehicle control unit 13a to cause the vehicle V to perform automatic traveling.

In a case in which the vehicle V is in the unmanned mode at the time of a disaster, when receiving an instruction of the temporary refuge place from the server device 100, the automatic driving control unit 13f causes the vehicle V to move to the temporary refuge place not hindering evacuation of the evacuees in accordance with the instruction.

At this point, as already described above with reference to FIG. 5, in a case in which the visibility is good, the automatic driving control unit 13f causes the unmanned vehicle V-u to take refuge to a road shoulder of the passage leading to the evacuation place e for the evacuees at the temporary refuge place. Due to this, passage of the evacuees can be prevented from being hindered in a situation in which the visibility is good.

As already described above with reference to FIG. 6, in a case in which the visibility is poor, the automatic driving control unit 13f causes the unmanned vehicle V-u to take refuge to the vicinity of the center of the passage leading to the evacuation place e for the evacuees at the temporary refuge place. Due to this, passage of the evacuees can be prevented from being hindered in a situation in which the visibility is poor.

Whether the visibility is good may be determined based on a recognition result obtained by the recognition unit 13e, or may be determined by the server device 100 based on sensing data of a sensor unit 50 in the facility (described later). In a case of a building, the onboard sensor unit 5 memorizes the number of detection objects, edges, or the like captured from a fixed camera position; and determines that the visibility is poor in a case where the number of presently-captured detection objects or edges is less than a threshold based on the memorized number. In a case of a vehicle, the onboard sensor unit 5 memorizes an average value of the numbers of detection objects, edges, or the like captured by an onboard camera; and determines that the visibility is poor in a case where the number of presently-captured detection objects or edges is less than a threshold based on the memorized average value. In a case of a vehicle, the onboard sensor unit 5 periodically detects the number of detection objects, edges, or the like captured by an onboard camera; and determines that the visibility is poor in a case where the number of presently-captured objects or edges is less than a threshold based on the number detected before a predetermined time interval or detected predetermined times ago.

Figure 10:
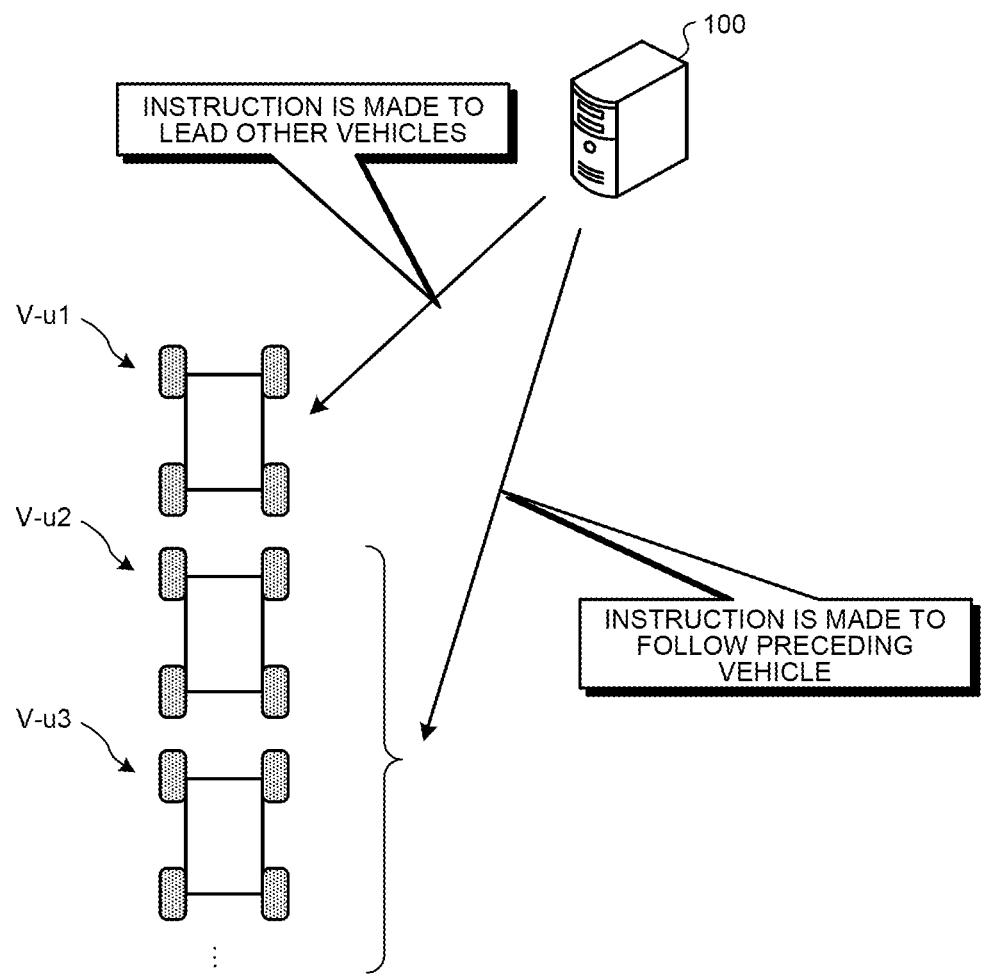
FIG. 10 is an operation explanatory diagram (part 1) of an unmanned vehicle during the disaster mode according to a modification.

The following describes a modification of the operation of the unmanned vehicle V-u during the disaster mode more specifically. FIG. 10 is operation explanatory diagrams (part 1) and (part 2) of the unmanned vehicle V-u during the disaster mode according to the modification.

As illustrated in FIG. 10, for example, the server device 100 instructs one unmanned vehicle V-u1 of the temporary refuge place and a refuge route thereto, and to lead other unmanned vehicles V-u2, V-u3 . . . present on the refuge route.

The server device 100 then instructs the unmanned vehicles V-u2, V-u3 . . . to follow the preceding unmanned vehicle V-u in order of presence on the refuge route led by the unmanned vehicle V-u1. The automatic driving control unit 13f of the unmanned vehicle V-u1 then causes the unmanned vehicle V-u1 to take refuge to the temporary refuge place by automatic traveling.

On the other hand, the automatic driving control unit 13f of the unmanned vehicles V-u2, V-u3 . . . detects, when the unmanned vehicle V-u to be followed by the automatic driving control unit 13f approaches, the unmanned vehicle V-u by vehicle-to-vehicle communication, for example, and causes each of the unmanned vehicles V-u2, V-u3 . . . to take refuge to the temporary refuge place by automatic traveling while following the unmanned vehicle V-u preceding itself.

Due to this, at the temporary refuge place, the unmanned vehicles V-u can be easily arranged in a line, for example.

As already described above, the unmanned vehicles V-u are preferably arranged in a line during temporary refuge. If the evacuees can be guided to the evacuation route in accordance with the unmanned vehicles V-u arranged in a line, safety of the evacuees can be more secured.

Figure 11:
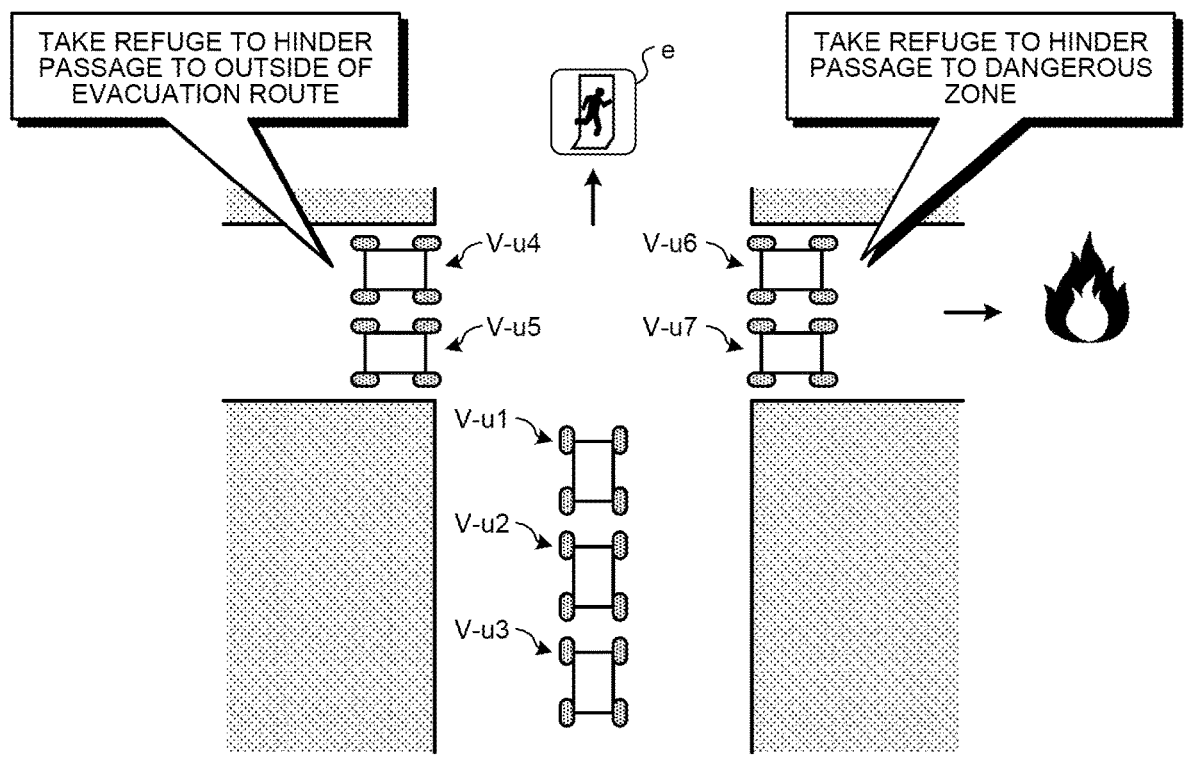
FIG. 11 is an operation explanatory diagram (part 2) of the unmanned vehicle during the disaster mode according to the modification.

For example, as illustrate in FIG. 11, the unmanned vehicles V-u may be arranged in a line in the vicinity of the center (or along the wall) of the passage like the unmanned vehicles V-u1, V-u2, and V-u3, or may be caused to take refuge to hinder passage of the evacuees to the outside of the evacuation route leading to the evacuation place e like unmanned vehicles V-u4 and V-u5.

The unmanned vehicles V-u may be caused to take refuge to hinder passage to a dangerous zone in which the disaster has occurred like unmanned vehicles V-u6 and V-u7. Due to this, the evacuees can be prevented from deviating from the evacuation route or erroneously entering the dangerous zone, so that safety of the evacuees can be secured. Note that the dangerous zone in which the disaster has occurred is, for example, a zone where a fire breaks out, a zone where a building has collapsed due to an earthquake or the like, a zone having a possibility that a building collapses due to occurrence of cracks or the like.

In a case of disposing the vehicle V to block off the passage, the vehicle V may be disposed at a byway point closest to a vehicle position at the time when a disaster occurs (a place where a moving distance is small) not to obstruct the evacuees. Alternatively, the vehicle V may be preferentially disposed on a byway to a dangerous point where a fire or the like has occurred, or a point where the evacuee tends to take a wrong way. Also in this case, it is preferable to preferentially dispose the vehicle V at a position close to the vehicle position at the time when a disaster occurs not to obstruct the evacuees.

In a case of FIG. 11, when approach of a person is detected, it is preferable to call attention of the evacuees by lighting or blinking the light 7 or making voice guidance. In this case, guidance may be made such that a traveling direction is not the evacuation route, the passage is blocked off because of danger, there is a correct evacuation route, and the like by voice information or display information.

Return to the description of FIG. 7. When an end condition for temporary refuge is established such as a case in which a state in which nobody is present in the surroundings has continued for a predetermined time or more after taking refuge to the temporary refuge place, the automatic driving control unit 13f can cause the unmanned vehicle V-u to move to an original standby place such as a garage by automatic traveling.

Whether nobody is present in the surroundings for a predetermined time or more may be determined based on a recognition result obtained by the recognition unit 13e, or may be determined by the server device 100 based on sensing data of the sensor unit 50 in the facility (described later).

In this way, by causing the unmanned vehicle V-u to move to the original standby place after evacuation of the evacuees, the vehicle V itself can be prevented from being damaged due to progress of the disaster. As the end condition for temporary refuge, exemplified are a case in which an instruction is given from the server device 100, a case in which a predetermined time has elapsed after the disaster occurs, a predetermined time has elapsed after temporary refuge is completed, and the like.

In a case in which the original standby place is dangerous due to influence of the disaster, or a case in which a route for moving to the place is unavailable due to the disaster, an alternate standby place is selected, and the vehicle is caused to move to this place. The original standby place and the alternate standby place may be the same as a place to which people are evacuated. The original standby place and the alternate standby place are preferably set so that all of the unmanned vehicles V-u in the facility are collected at the same point as much as possible for a countermeasure such as collection of the vehicles V. However, in a case in which there is no sufficient space for collecting the vehicles, or a case in which the vehicles cannot be collected because the passage is blocked off, the unmanned vehicles V-u may be distributed to a plurality of points.

Subsequently, the following describes a configuration example of the server device 100. As illustrated in FIG. 8, the server device 100 is connected to the sensor unit 50 in the facility.

The sensor unit 50 in the facility is a sensor group that is installed in the facility, and outputs various kinds of sensing data indicating situations in the facility. The sensor unit 50 in the facility includes, for example, a camera, a human sensor, a temperature/humidity sensor, a G sensor, a vibration sensor, and the like.

The server device 100 includes a communication unit 101, a storage unit 102, and a control unit 103. The communication unit 101 is, for example, implemented by an NIC and the like similarly to the communication unit 11 described above.

The communication unit 101 is connected to the network N described above in a wired or wireless manner, and transmits/receives various kinds of information to/from the onboard device 10 and the disaster information providing device 200 via the network N. As a specific wireless communication scheme in a case of being connected in a wireless manner, Wi-Fi, Bluetooth, UWB, and the like can be used.

Similarly to the storage unit 12 described above, for example, the storage unit 102 is implemented by a storage device such as a RAM and a flash memory, or a disk device such as a hard disk device and an optical disc device. In the example of FIG. 8, the storage unit 102 stores facility management information 102a.

The facility management information 102a is various kinds of information about the facility managed by the server device 100. The facility management information 102a includes, for example, all pieces of map information in the facility, information about all pieces of disaster prevention equipment, a designated evacuation place at the time when a disaster occurs, monitor monitoring information in the facility, a current state of the vehicle V, and the like. The current state of the vehicle V includes a current position of the vehicle V, a usage state of the vehicle V, attribute information of a user who is using the vehicle V, and the like. The attribute information of the user is, for example, information indicating an attribute that indicates a degree to which the user can move by himself/herself. For example, an attribute of an able-bodied person is that he/she can move similarly to another user not using the vehicle V even after getting off the vehicle V. For example, an attribute of a disabled person is that he/she is difficult to move by himself/ herself, and needs to be supported by a care worker and the like. Furthermore, an attribute such as an old person can be considered.

Similarly to the control unit 13 described above, the control unit 103 is a controller, and implemented when various computer programs (not illustrated) stored in the storage unit 102 are executed by using a RAM as a working area by a CPU, an MPU, and the like. Similarly to the control unit 13 described above, the control unit 103 can be implemented by an integrated circuit such as an ASIC, an FPGA, and the like, for example.

The control unit 103 includes an acquisition unit 103a, a monitoring unit 103b, a detection unit 103c, a calculation unit 103d, and an instruction unit 103e, and implements or executes a function or operation of information processing described below.

The acquisition unit 103a acquires various kinds of sensing data from the sensor unit 50 in the facility. The acquisition unit 103a also acquires various kinds of information from the vehicle V and the disaster information providing device 200 via the communication unit 101.

The monitoring unit 103b monitors a situation in the facility in real time based on the sensing data acquired by the acquisition unit 103a.

The detection unit 103c detects occurrence of a disaster based on various kinds of information acquired by the acquisition unit 103a. The calculation unit 103d calculates, in a case in which the detection unit 103c detects occurrence of the disaster, a moving place and a moving route for each of the vehicles V based on the facility management information 102a.

For the manned vehicle V-m, the calculation unit 103d calculates an evacuation place appropriate for evacuation within the movable range of the manned vehicle V-m, and an evacuation route heading for the evacuation place. The evacuation route may include normal stairs, an escalator, and the like, which are not emergency stairs (an emergency exit). For the unmanned vehicle V-u, the calculation unit 103d calculates a temporary refuge place appropriate for preventing the unmanned vehicle V-u from hindering passage of the evacuees, and a refuge route heading for the temporary refuge place.

The instruction unit 103e instructs the vehicle V of the moving place and the moving route calculated by the calculation unit 103d via the communication unit 101. That is, the instruction unit 103e instructs the manned vehicle V-m of the evacuation place appropriate for evacuation within the movable range of the manned vehicle V-m and the evacuation route heading for the evacuation place. The instruction unit 103e instructs the unmanned vehicle V-u of the temporary refuge place appropriate for preventing the unmanned vehicle V-u from hindering passage of the evacuees and the refuge route heading for the temporary refuge place.

Next, the following describes a processing procedure performed by the onboard device 10 according to the embodiment. FIG. 12 is a flowchart illustrating the processing procedure performed by the onboard device 10 according to the embodiment.

As illustrated in FIG. 12, the detection unit 13c detects whether the disaster has occurred (Step S101). If the disaster has occurred (Yes at Step S101), the detection unit 13c detects whether the user is riding on the vehicle (Step S102). If the disaster has not occurred (No at Step S101), the normal mode is maintained, and Step S101 is repeated while control is performed in the normal mode.

If the user is riding on the vehicle (Yes at Step S102), that is, if the vehicle V is the manned vehicle V-m, the mode setting unit 13d causes the vehicle V to shift to the manned mode at the time of a disaster (Step S103). If the user is not riding on the vehicle (No at Step S102), transition is made to Step S107 (described later).

The acquisition unit 13b then acquires the evacuation place instructed by the server device 100 and the evacuation route heading for the evacuation place (Step S104). The vehicle control unit 13a then causes the vehicle V to move to the evacuation place along the evacuation route (Step S105). At this point, the vehicle V may be caused to perform manual traveling or automatic traveling.

The detection unit 13c then detects whether the user has got off the vehicle (Step S106). If the user has not got off the vehicle (No at Step S106), Step S106 is repeated. If the user has got off the vehicle (Yes at Step S106), transition is made to Step S107.

If the user is not riding on the vehicle (No at Step S102), or if the user who was riding on the vehicle has got off the vehicle (Yes at Step S106), the mode setting unit 13d causes the vehicle V to shift to the unmanned mode at the time of a disaster (Step S107).

The acquisition unit 13b then acquires the temporary refuge place instructed by the server device 100 (Step S108). The automatic driving control unit 13f then causes the vehicle control unit 13a to cause the vehicle V to move to the temporary refuge place not hindering evacuation of the evacuees by automatic traveling (Step S109).

The detection unit 13c then detects whether temporary refuge has ended (Step S110). That is, the detection unit 13c detects whether a state in which nobody is present in the surroundings has continued for a predetermined time or more after the vehicle V takes refuge to the temporary refuge place.

If temporary refuge has not ended (No at Step S110), Step S110 is repeated. If temporary refuge has ended (Yes at Step S110), the automatic driving control unit 13f causes the vehicle control unit 13a to cause the vehicle V to move to the original standby place by automatic traveling (Step S111), and the process is ended.

As described above, the onboard device 10 according to the embodiment is a vehicle control device mounted on the vehicle V that travels in a predetermined facility (corresponding to an example of an "area"), and includes the control unit 13. If nobody is riding on the vehicle V in a case in which disaster requiring evacuation occurs, the control unit 13 causes the vehicle V to move to the temporary refuge place not hindering evacuation of the evacuees (corresponding to an example of the "refuge place").

Accordingly, with the onboard device 10 according to the embodiment, evacuation action of the evacuees can be prevented from being hindered.

The facility is a building. At the time of causing the passage to be the temporary refuge place, in a case in which the visibility in the surroundings of the vehicle V is good, the control unit 13 causes the vehicle V to move to the wall side of the passage.

Accordingly, with the onboard device 10 according to the embodiment, in a case in which the visibility in the surroundings of the vehicle V is good, the evacuees can easily evacuate along the evacuation route.

At the time of causing the passage to be the temporary refuge place, in a case in which the visibility in the surroundings of the vehicle V is poor, the control unit 13 causes the vehicle V to move to a position distant from the wall of the passage.

Accordingly, with the onboard device 10 according to the embodiment, in a case in which the visibility in the surroundings of the vehicle V is poor, the evacuees can easily evacuate along the wall side along which the evacuees tend to move.

After the vehicle V has moved to the refuge place described above, if the end condition for temporary refuge (for example, a state in which nobody is present in the surroundings has continued for a predetermined time or more) is established, the control unit 13 causes the vehicle V to move to a final standby place.

Accordingly, with the onboard device 10 according to the embodiment, the vehicle V itself can be prevented from being damaged due to progress of the disaster.

The control unit 13 causes a place hindering passage of the evacuees to the outside of the evacuation route to be the temporary refuge place.

Accordingly, with the onboard device 10 according to the embodiment, the evacuees can be prevented from deviating from the evacuation route, so that safety of the evacuees can be secured.

The control unit 13 also causes a place hindering entry of the evacuees to a dangerous zone to be the temporary refuge place.

Accordingly, with the onboard device 10 according to the embodiment, the evacuees can be prevented from erroneously entering the dangerous zone, so that safety of the evacuees can be secured.

In the embodiment described above, the unmanned vehicle V-u is assumed to be the vehicle V on which the user can ride, but the unmanned vehicle V-u may be a vehicle specialized in unmanned use. For example, the unmanned vehicle V-u may be an unmanned self-propelled cleaning robot, a self-propelled porter robot, and the like.

The vehicle V may be a vehicle on which two or more people can ride. The vehicle V is not necessarily a type lent out to a customer, but may be a type such as a passenger bus on which a plurality of people can ride that rounds along a predetermined route.

In the embodiment described above, the facility is assumed to be an example of the predetermined area. However, such an area is not limited to the inside of the facility, but may be a larger region such as a business area in which an unmanned bus or a taxi travels.

If the vehicle V is disposed to be able to be operated based on an instruction from a server device of an administrative organ and the like at the time of a disaster, the vehicle V is not necessarily a vehicle that travels only in the predetermined area but may be a vehicle owned by an individual in an administrative area.

According to an aspect of an embodiment, evacuation action of evacuees can be prevented from being hindered.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control method executed by a controller that controls a vehicle which is configured to hold one or more persons and travel in an area in a building, the method comprising:
   in a case in which occurrence of a disaster has been detected and it has been determined that nobody is riding on the vehicle, cause the vehicle to move to a standby place,
   wherein causing the vehicle to move to the standby place includes determining the standby place as a place at which the vehicle (i) blocks an evacuee from deviating from an evacuation route and/or (ii) prevents the evacuee from entering a dangerous zone, and then transmitting the standby place to the vehicle so that the vehicle autonomously travels to the standby place.

2. The vehicle control method according to claim 1, further comprising:
   in a case in which it has been determined that visibility in surroundings of the vehicle is good in a passage leading to the standby place, cause the vehicle to move adjacent to a wall of the passage.

3. The vehicle control method according to claim 1, further comprising:
   in a case in which it has been determined that visibility in surroundings of the vehicle is poor in a passage leading to the standby place, cause the vehicle to move to a position that is spaced away from a wall of the passage.

4. The vehicle control method according to claim 1, further comprising:
   in a case in which it has been determined that an end condition for temporary standby is established after the vehicle has moved to the standby place, cause the vehicle to move to a final standby place.

5. The vehicle control method according to claim 1, wherein
   the standby place is in a passage on the evacuation route.

6. The vehicle control method according to claim 5, further comprising:
   causing a light of the vehicle that has moved to the standby place to turn ON.

7. The vehicle control method according to claim 1, wherein
   the dangerous zone includes a place in which the disaster has occurred.

8. A vehicle control method executed by a controller that controls a vehicle which is configured to hold one or more persons and travel in a building, the method comprising:
   in a case in which occurrence of a disaster has been detected and it has been determined that nobody is riding on the vehicle and the vehicle is located in a passage on an evacuation route, cause the vehicle to move to a standby place in the passage; wherein
   the standby place is spaced away from a wall of the passage when visibility in the passage is poor so that evacuees can move along the wall of the passage on the evacuation route, and
   the standby place is adjacent to the wall of the passage when visibility in the passage is not poor.

9. The vehicle control method according to claim 2, further comprising:
   executing image recognition on an image that is captured by a camera provided in the vehicle or the building to determine an extent of the visibility.

10. A vehicle control device comprising a controller that controls a vehicle which is configured to hold one or more persons and travel in an area in a building, wherein
the controller is configured to:
in a case in which occurrence of a disaster has been detected and it has been determined that nobody is riding on the vehicle, cause the vehicle to move to a standby place,
wherein causing the vehicle to move to the standby place includes determining the standby place as a place at which the vehicle (i) blocks an evacuee from deviating from an evacuation route and/or (ii) prevents the evacuee from entering a dangerous zone, and then transmitting the standby place to the vehicle so that the vehicle autonomously travels to the standby place.

\* \* \* \* \*